United States Patent
Uemura et al.

(10) Patent No.: US 7,765,391 B2
(45) Date of Patent: Jul. 27, 2010

(54) MULTIPROCESSOR SYSTEM AND BOOT-UP METHOD OF SLAVE SYSTEM

(75) Inventors: Mariko Uemura, Kanagawa (JP); Kei Suda, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 749 days.

(21) Appl. No.: 11/655,075

(22) Filed: Jan. 19, 2007

(65) Prior Publication Data

US 2007/0186092 A1 Aug. 9, 2007

(30) Foreign Application Priority Data

Feb. 9, 2006 (JP) ............... 2006-032038

(51) Int. Cl.
*G06F 15/177* (2006.01)
(52) U.S. Cl. ............... 713/1; 713/2; 713/100
(58) Field of Classification Search ............ 713/1, 713/2, 100
See application file for complete search history.

(56) References Cited

U.S. PATENT DOCUMENTS

| | | | |
|---|---|---|---|
| 5,408,624 A | * | 4/1995 | Raasch et al. ............... 717/173 |
| 5,754,863 A | * | 5/1998 | Reuter ............... 717/173 |
| 6,275,875 B1 | | 8/2001 | Yamada |
| 6,438,683 B1 | * | 8/2002 | Endsley ............... 713/1 |
| 2003/0200428 A1 | * | 10/2003 | Chan et al. ............... 713/1 |
| 2006/0056630 A1 | * | 3/2006 | Zimmer et al. ............... 380/256 |
| 2007/0157016 A1 | * | 7/2007 | Dayan et al. ............... 713/2 |

FOREIGN PATENT DOCUMENTS

| | | |
|---|---|---|
| EP | 0 335 812 A2 | 2/1989 |
| EP | 1 486 869 A2 | 12/2004 |
| JP | 4-098448 | 3/1992 |
| JP | 5-242057 | 9/1993 |
| JP | 10-320366 | 12/1998 |
| JP | 2000-0137671 A | 5/2000 |
| JP | 2005-031796 | 2/2005 |
| KR | 1997-0002882 | 1/1994 |

* cited by examiner

*Primary Examiner*—Nintin C Patel
(74) *Attorney, Agent, or Firm*—Foley & Lardner LLP

(57) ABSTRACT

To provide a multiprocessor system and a boot-up method of a slave system, which can reduce the number of components with simple configuration. A multiprocessor system according to an embodiment of the present invention includes a master system, and a slave system connected with the master system through an interprocessor communication interface. The master system includes a program ROM storing a boot program for the slave system. The slave system includes a loader downloading the boot program stored in the program ROM through the interprocessor communication interface.

12 Claims, 4 Drawing Sheets

RELATED ART

MULTIPROCESSOR SYSTEM AND BOOT-UP METHOD OF SLAVE SYSTEM

BACKGROUND OF THE INVENTION

1. Field of the Invention

The present invention relates to a multiprocessor system including plural processors, and more particularly to a boot-up method of a slave system used in a multiprocessor system including a master system and a slave system.

2. Description of Related Art

As a solution to the problem of how to improve a performance of a built-in device and save power, attentions have been paid to a multiprocessor system including plural processor cores (see "Multicore" in Embedded Field, Tasks of Enabling Multi-function in hardware/software component, Outline and packaging example of OS", YOSHIDA Masayasu, HONDA Shinya, Design Wave Magazine, August issue, 2005, CQ publishing Co., Ltd., for example).

FIG. 4 is a diagram of a conventional multiprocessor system. As shown in FIG. 4, the conventional multiprocessor system includes a master system 10 and a slave system 20. The master system 10 includes a CPU (Central Processor Unit) 11, a RAM (Random Access Memory) 12, a program ROM (Read Only Memory) 13, and a data interface (I/F) circuit 14. Similar to the master system 10, the slave system 20 includes a CPU 21, a RAM 22, a program ROM 24, and a data interface (I/F) circuit 23.

In the Related Art of FIG. 4, the master system 10 and the slave system 20 each includes a program ROM. The master system 10 and the slave system 20 boot the CPUs 11 and 21, respectively in accordance with a boot program stored in the program ROM. Thus, the Related Art of FIG. 4 has a problem that the number of components is large because both of the master system 10 and the slave system 20 include the program ROM such as a mask ROM or FLASH. In particular, along with advancements in system configuration, recent multiprocessor systems often include two or more slave systems, so program ROMs as many as slave systems should be provided. The increase in the number of components becomes a serious problem.

Japanese Unexamined Patent Publication No. 2000-137671 discloses a technique regarding a control system using a multi-bus rack, and more particularly focuses on a technique of transferring a program from a ROM on a master substrate to a RAM on another substrate (slave substrate). Further, Japanese Unexamined Patent Publication No. 10-320366 discloses a technique of transferring a common boot program from a master CPU to a slave CPU to thereby boot the slave CPU. Japanese Unexamined Patent Publication No. 4-98448 discloses a technique of sharing a program ROM among plural CPUs in a multi-CPU memory system but gives no description of a multiprocessor system including a master system and a slave system. Further, Japanese Unexamined Patent Publication No. 2005-31796 discloses a technique of downloading a program to a communication device including plural CPUs from another communication device but gives no description of a multiprocessor system including a master system and a slave system.

The technique as disclosed in Japanese Unexamined Patent Publication No. 2000-137671 has a problem in that complicated hardware configuration is necessary for transferring the program because the program is transferred through a common memory bus from the master substrate to the slave substrate.

With regard to the technique as disclosed in Japanese Unexamined Patent Publication No. 10-320366, a common boot program from the master CPU is temporarily stored in a dual port RAM, and the slave CPU downloads the program and boots up. For such configuration, it is necessary to prepare an expensive dual port RAM and lay out memory bus lines on both sides of the RAM. This causes a problem in that the number of components and costs increase.

SUMMARY OF THE INVENTION

A multiprocessor system according to an aspect of the present invention includes: a master system; and a slave system connected with the master system through an interprocessor communication interface, the master system including a program memory storing a boot program for the slave system, and the slave system including a loader downloading the boot program stored in the program memory through the interprocessor communication interface. According to the above configuration of the present invention, it is unnecessary to provide the slave system with a program memory for storing a boot program, so the number of components can be reduced. In particular, the boot program is downloaded through the interprocessor communication interface, whereby the loader configuration can be simplified.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
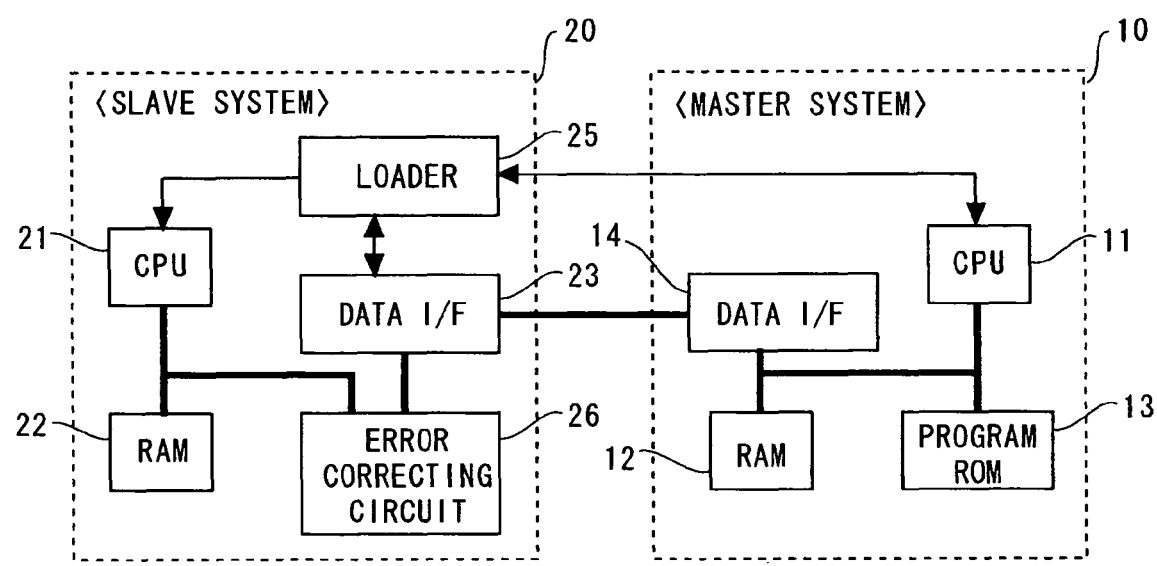
FIG. 1 is a diagram of a multiprocessor system according to an embodiment of the present invention.

FIG. 1 is a diagram of a multiprocessor system according to an embodiment of the present invention. The multiprocessor system of this embodiment can be embedded in, for example, a cell phone. In FIG. 1, the multiprocessor system includes a master system 10 and a slave system 20. The multiprocessor system of this embodiment is packed into one chip and has heterogeneous structure. Although provided with one master system 10 and one slave system 20 in the illustrated example of FIG. 1, the system may include plural slave systems 20.

The master system 10 includes a CPU 11, a RAM 12, a program ROM 13, and a data interface (I/F) circuit 14. The CPU 11 is connected with the RAM 12, the program ROM 13, and the data interface (I/F) circuit 14 through a data bus.

The program ROM 13 of this embodiment stores a boot program for the slave system 20 in addition to a boot program for the master system 10.

The slave system 20 includes a CPU 21, a RAM 22, a data interface (I/F) circuit 23, a loader 25, and an error correcting circuit 26. The slave system 20 of this embodiment does not include a program ROM 24. The CPU 21 is connected with the RAM 22 and the error correcting circuit 26 and with the data I/F circuit 23 through the error correcting circuit 26. The loader 25 is connected with the CPU 21 and the data I/F circuit 23 through a control line.

The loader 25 is an auto initial program loader downloading a boot program for the slave system 20a from the master system 10 prior to boot-up of the CPU 21 in the slave system 20, and is configured by hardware components, not software components. The loader 25 realizes a simple communication protocol and has a function of transferring data to the RAM 22.

The error correcting circuit 26 executes error correction on the boot program downloaded from the master system 10.

The data I/F circuit 14 of the master system 10 and the data I/F circuit 23 of the slave system 20 are interface circuits that realize an inter-CPU communication I/F used in a normal mode with a program transfer phase. In this embodiment, in particular, the data I/F circuit 14 and the data I/F circuit 23 are directly connected together via a serial data bus not through a memory. That is, the data I/F circuit 14 and the data I/F circuit 23 of this embodiment are not connected through a common memory bus. The data I/F circuit 14 and the data I/F circuit 23 may be connected through two or four parallel data buses in place of the serial data bus.

Further, the CPU 11 of the master system 10 and the loader 25 are connected through a control line.

Figure 2:
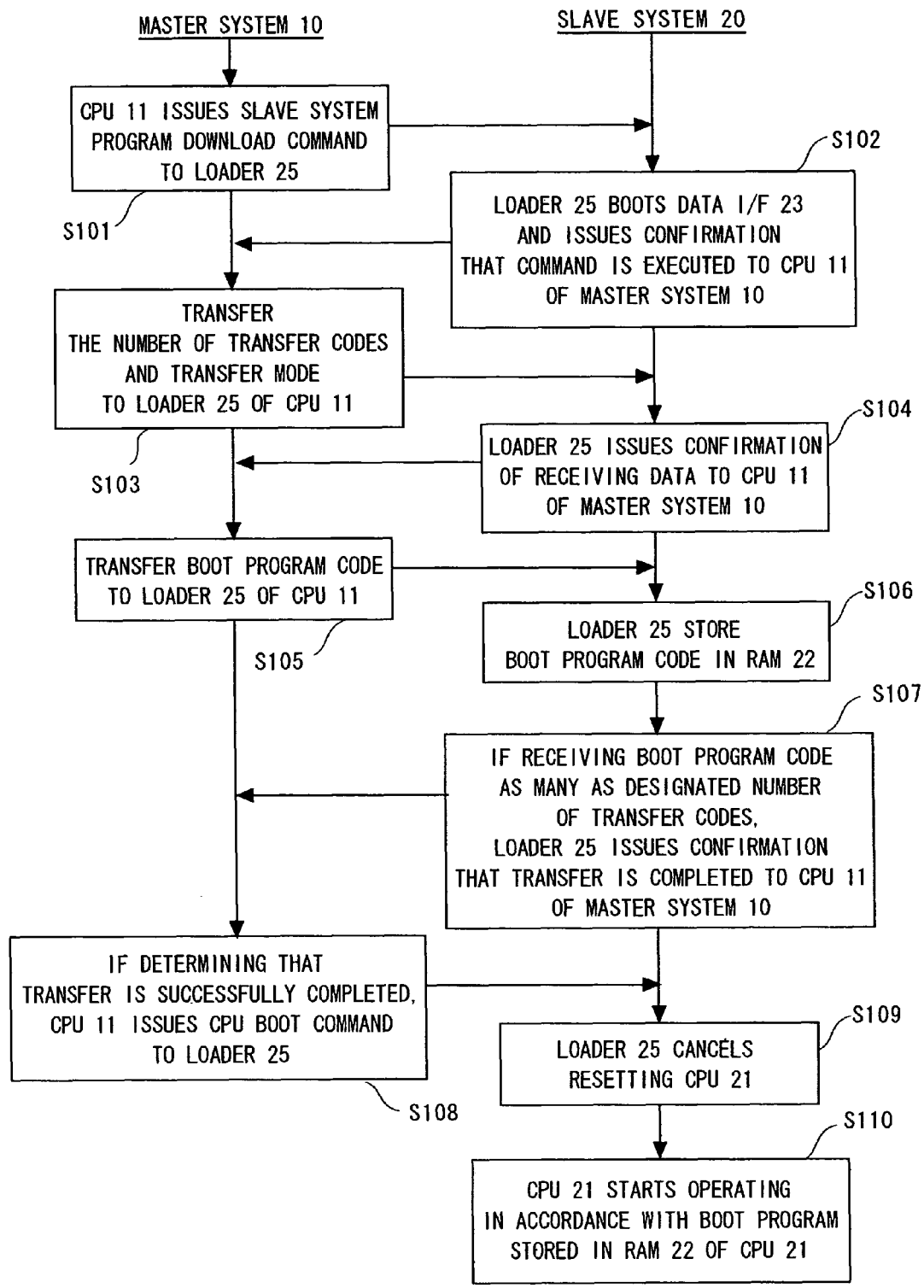
FIG. 2 is a flowchart of a processing flow of the multiprocessor system according to the embodiment of the present invention.

Referring next to a flowchart of FIG. 2, a processing flow of the multiprocessor system of this embodiment is described. Regarding a system status just before the flow, the master system 10 is booted and the slave system 20 is not booted at a stage.

First, the CPU 11 of the master system 10 issues a command to download the boot program for the slave system to the loader 25 of the slave system 20 through a control line (S101).

Receiving the download command, the loader 25 of the slave system 20 boots the data I/F circuit 23 of the slave system 20 in accordance with the command. Along with the boot-up, the data I/F circuit 23 is booted. Further, the loader 25 sends confirmation that the download command is executed to the CPU 11 of the master system 10 (S102).

The CPU 11 of the master system 10 receives the confirmation from the loader 25. In response to the confirmation, the CPU transfers data about the number of transfer codes and a transfer mode to the loader 25 through the data I/F circuit 14 (S103).

The loader 25 of the slave system 20 receives the data about the number of transfer codes and a transfer mode transferred from the CPU 11 of the master system 10 through the data I/F circuit 14 and the serial data line, through the data I/F circuit 23 and stores the received data in a predetermined memory. After receiving the data about the number of transfer codes and a transfer mode, the loader 25 issues confirmation of receiving the data to the CPU 11 of the master system 10 through the control line (S104).

When receiving the confirmation through the control line, the CPU 11 of the master system 10 transfers program codes of the boot program to the loader 25 of the slave system 20 through the data I/F circuits 14 and 23 (S105). At this time, ECC (Error Correcting Code) bits may be given or may not be given to the program codes.

The loader 25 of the slave system 20 stores the program codes transferred from the master system 10 in the RAM 22 through the data I/F circuit 23. At this time, if the program codes transferred from the master system 10 are given ECC bits, the codes are stored in the RAM 22 after the error correcting circuit 26 executes error correction (S106). Then, the above processes of steps S105 and S106 are repeated as many times as the program codes of the boot program for the slave system 20.

The loader 25 of the slave system 20 determines whether or not the program codes as many as the transfer codes transferred from the CPU 11 are received in step S103. If it is determined that the program codes as many as the transfer codes are received, the loader 25 sends the number of codes and transfer status information as confirmation that the transfer is completed, to the CPU 11 of the master system 10 through the control line (S107).

Receiving the confirmation that the transfer is completed through the control line, the CPU 11 of the master system 10 checks the confirmation. If determining that the transfer is successfully completed as a result of checking the confirmation, the CPU 11 issues a command to boot the CPU 21 of the slave system 20 to the loader 25 of the slave system 20 through the control line (S108).

Receiving the boot-up command from the CPU 11 of the master system 10 through the control line, the loader 25 of the slave system 20 cancels resetting the CPU 21 of the slave system 20 (S109).

Then, the CPU 21 of the slave system 20 starts operating in accordance with the boot program stored in the RAM 22 of the slave system 20 (S110).

As described above, according to the embodiment of the present invention, the program ROM only needs to be provided in the master system 10 and does not need to provided in the slave system 20. Hence, it is possible to reduce the number of components and costs.

Further, according to the embodiment of the present invention, the boot program for the slave system 20 stored in the program ROM 13 of the master system 10 is transferred to the RAM 22 of the slave system 20 via the inter-CPU communication I/F not through a memory, making it possible to reduce the number of components and costs. In particular, the circuit configuration for data transfer becomes simpler than the configuration of transferring the boot program for the slave system 20 through a common memory bus.

Incidentally, in the above example, the loader 25 of the slave system 20 checks the number of transfer codes to identify the program code at the end of the boot program. However, the present invention is not limited to this, and the CPU 11 of the master system 10 may add an end code at the end of the program. Alternatively, the loader 25 of the slave system 20 may measure the elapsed time since the program code was received with a timer and determine that the transfer is completed if the elapsed time exceeds a predetermined period.

Figure 3A:
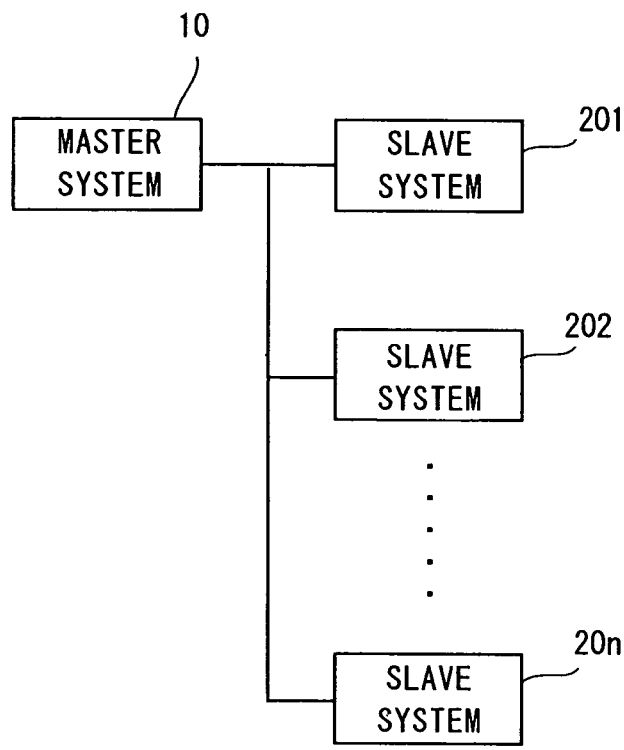
FIGS. 3A and 3B are diagrams of the multiprocessor system according to the embodiment of the present invention.
Figure 3B:
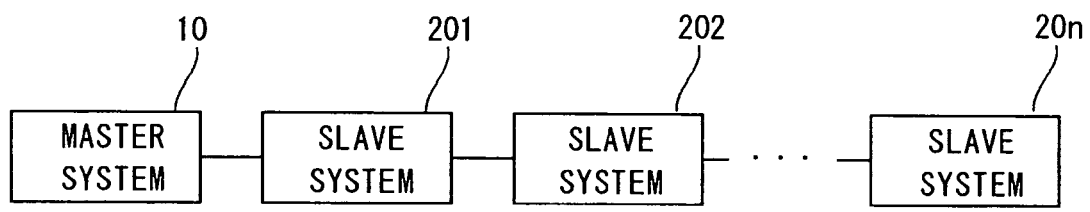
Figure 4:
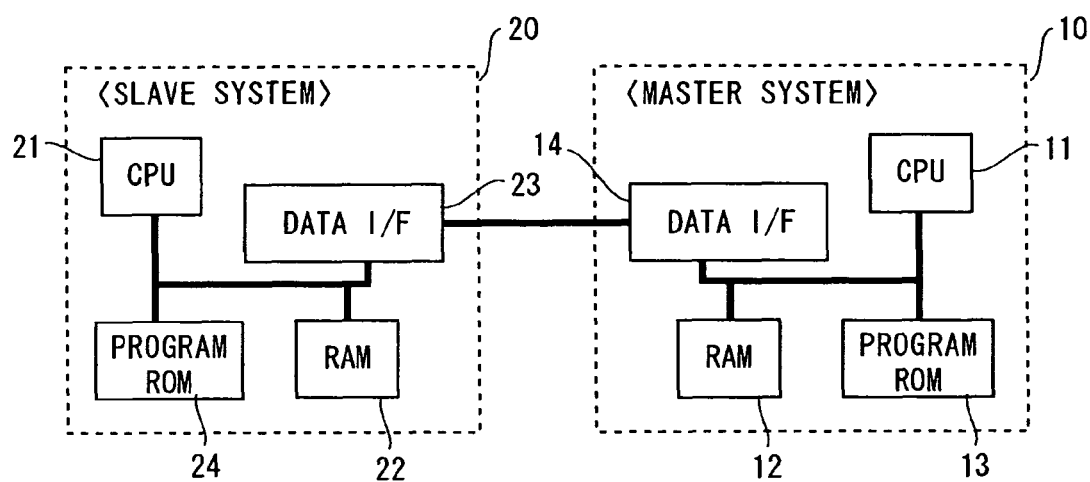
FIG. 4 is a diagram of a conventional multiprocessor system.

Further, the above embodiment describes the configuration where the slave system 20 and the master system 10 are provided in a one-to-one relationship, but the present invention is not limited to such configuration. As shown in FIG. 3A, plural slave systems 201, 202, . . . , 20n, each of which includes the loader 25, may be parallel-connected to the master system 10. Alternatively, as shown in FIG. 3B, plural slave systems 201, 202, . . . , 20n, each of which includes the loader 25, may be series-connected with the master system 10. Moreover, the slave systems may be connected in matrix.

In the configuration of FIG. 3A, the program ROM 13 of the master system 10 may store boot programs for the slave systems 201, 202, . . . , 20n independently, but the slave systems may share one boot program.

In the configuration of FIG. 3B, the slave system 201 connected with the master system 10 may receive boot programs for the slave systems 202 to 203n from the master system 10 and temporarily store the programs in the RAM 22, and then repeatedly transfer and relay the programs in order.

It is apparent that the present invention is not limited to the above embodiment that may be modified and changed without departing from the scope and spirit of the invention.

What is claimed is:

1. A multiprocessor system, comprising:
a master system including a program memory;
a slave system including a slave processor and a memory thereof, the program memory storing a boot program for the slave processor;
an interprocessor communication interface coupled between the master system and the slave system, and configured to communicate between the master system and the slave system; and
a loader provided within the slave system, and configured to download the boot program from the program memory to the memory through the interprocessor communication interface before the slave processor is booted up.

2. The multiprocessor system according to claim 1,
wherein the master system further includes a master processor, and
wherein the slave system further includes an error correcting circuit configured to execute error correction when a program code of the boot program has an ECC bit, and
wherein the master processor includes:
a unit issuing a download command to the loader for indicating to start downloading the boot program; and
a unit transferring the boot program to the slave system, and
wherein the loader includes:
a unit issuing confirmation that the issued download command is executed, to the master processor; and
a unit receiving the transferred boot program and storing the received boot program in the memory.

3. The multiprocessor system according to claim 1, wherein the interprocessor communication interface is a serial communication interface.

4. The multiprocessor system according to claim 1, wherein the interprocessor communication interface is a serial bus.

5. The multiprocessor system according to claim 1,
wherein the interprocessor communication interface is coupled between the master system and the slave system without an intervention of a predetermined memory device.

6. A boot-up method of a slave system including a slave processor and connected with a master system through an interprocessor communication interface, comprising:
transferring a boot program for booting up the slave processor from the master system to the slave system through an interprocessor communication interface before the slave processor is booted up;
storing the boot program in a memory included in the slave system, before the slave processor is booted up;
booting up the slave processor in accordance with the boot program stored in the memory;
issuing a download command to download the boot program to a loader of the slave system from a master processor of the master system prior to transferring the boot program to the slave system; and
issuing confirmation that the issued download command is executed to the master processor from the loader of the slave system.

7. The boot-up method of a slave system according to claim 6, further comprising:
executing error correction of the boot program when a program code of the boot program includes ECC bits.

8. A multi processor system, comprising:
a slave system including a memory thereof and a slave processor;
a master system including a master processor and a program memory configured to store a boot program of the slave processor;
a communication interface coupled between the master system and the slave system, and configured to communicate between the master system and the slave system;
a loader provided within the slave system, and configured to download the boot program to the memory with the communication interface, wherein the loader downloads the boot program before the slave processor is booted up; and
a control line coupled between the master processor and the loader, and configured to communicate control commands between the master processor and the loader without an intervention of the communication interface.

9. The multi processor system according to claim 8, wherein the communication interface is a serial bus.

10. The multi processor system according to claim 9, further comprising a plurality of the slave system coupled to the master system with the serial bus.

11. The multi processor system according to claim 8, further comprising:
an error correcting circuit provided within the slave system, and configured to execute error correction of the boot program when a program code of the boot program has a ECC bit.

12. The multi processor system according to claim 8, wherein the loader is configured by hardware components, not software components.

* * * * *